June 21, 1949. W. WILDER ET AL 2,473,741
PATTERN CONTROLLED MILLING MACHINE
Filed Nov. 6, 1943 7 Sheets-Sheet 5
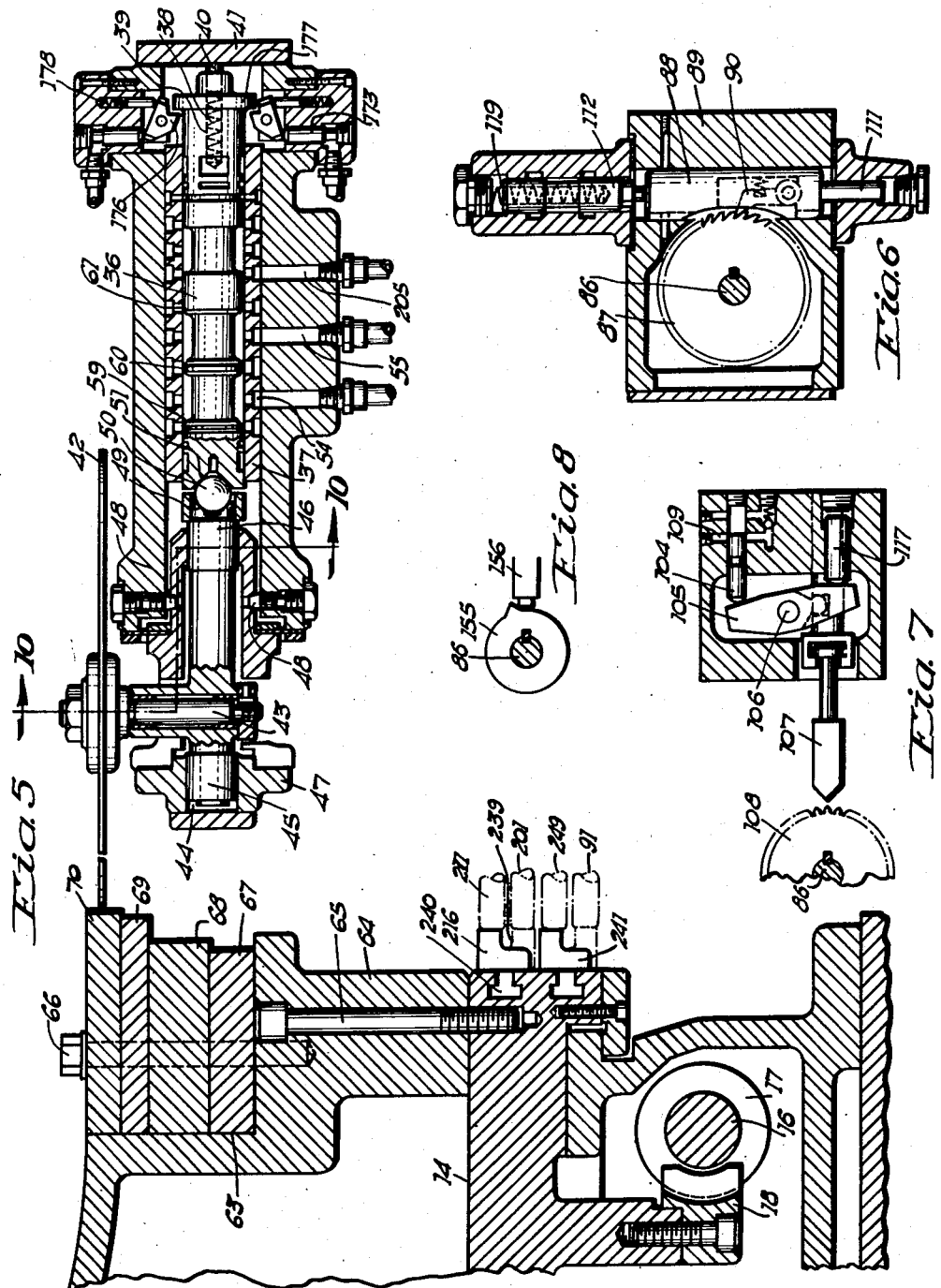
INVENTOR.
WARREN WILDER
HERMAN HORLACHER
BY Leigh W. Wright
ATTORNEY.

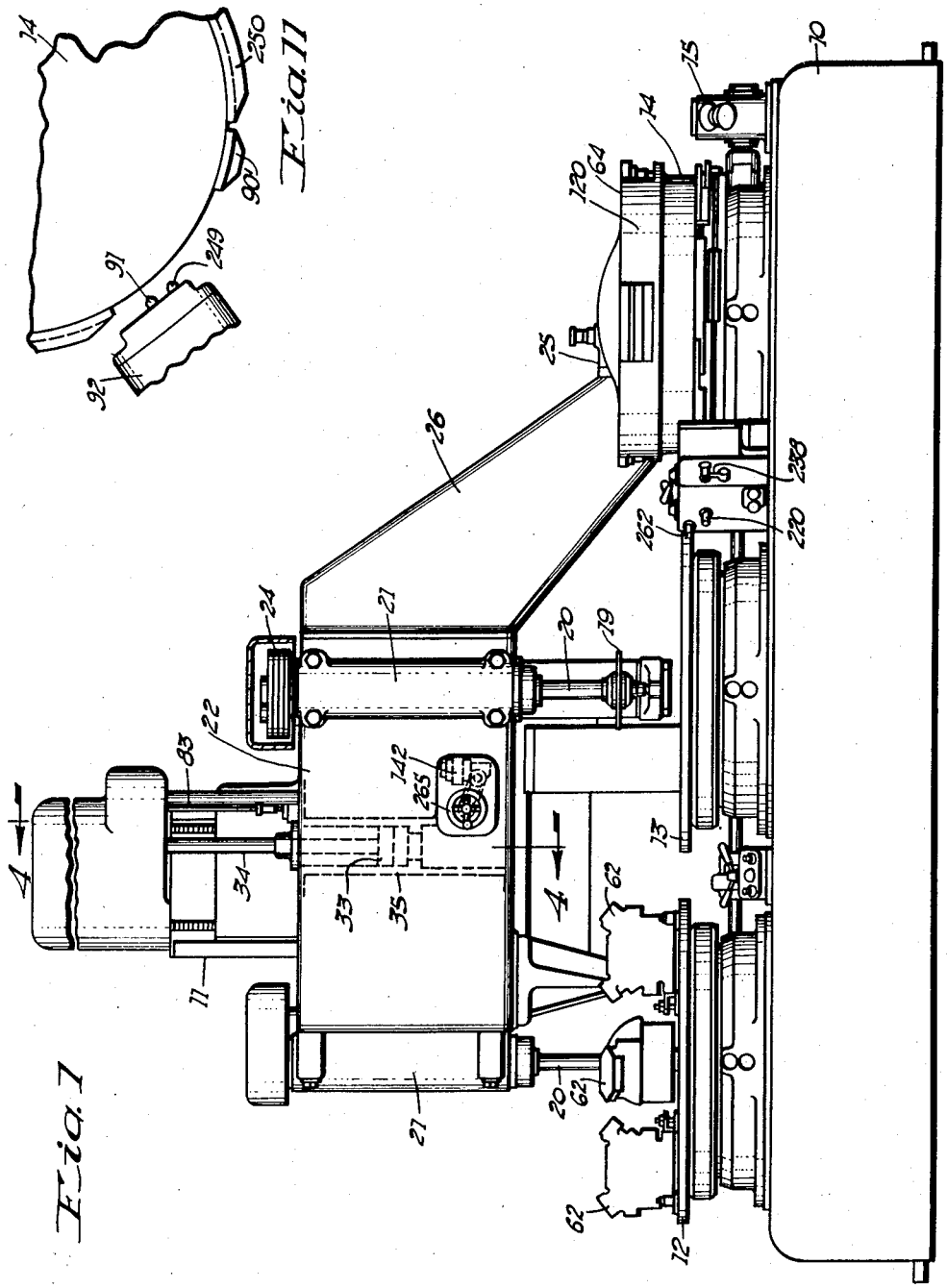

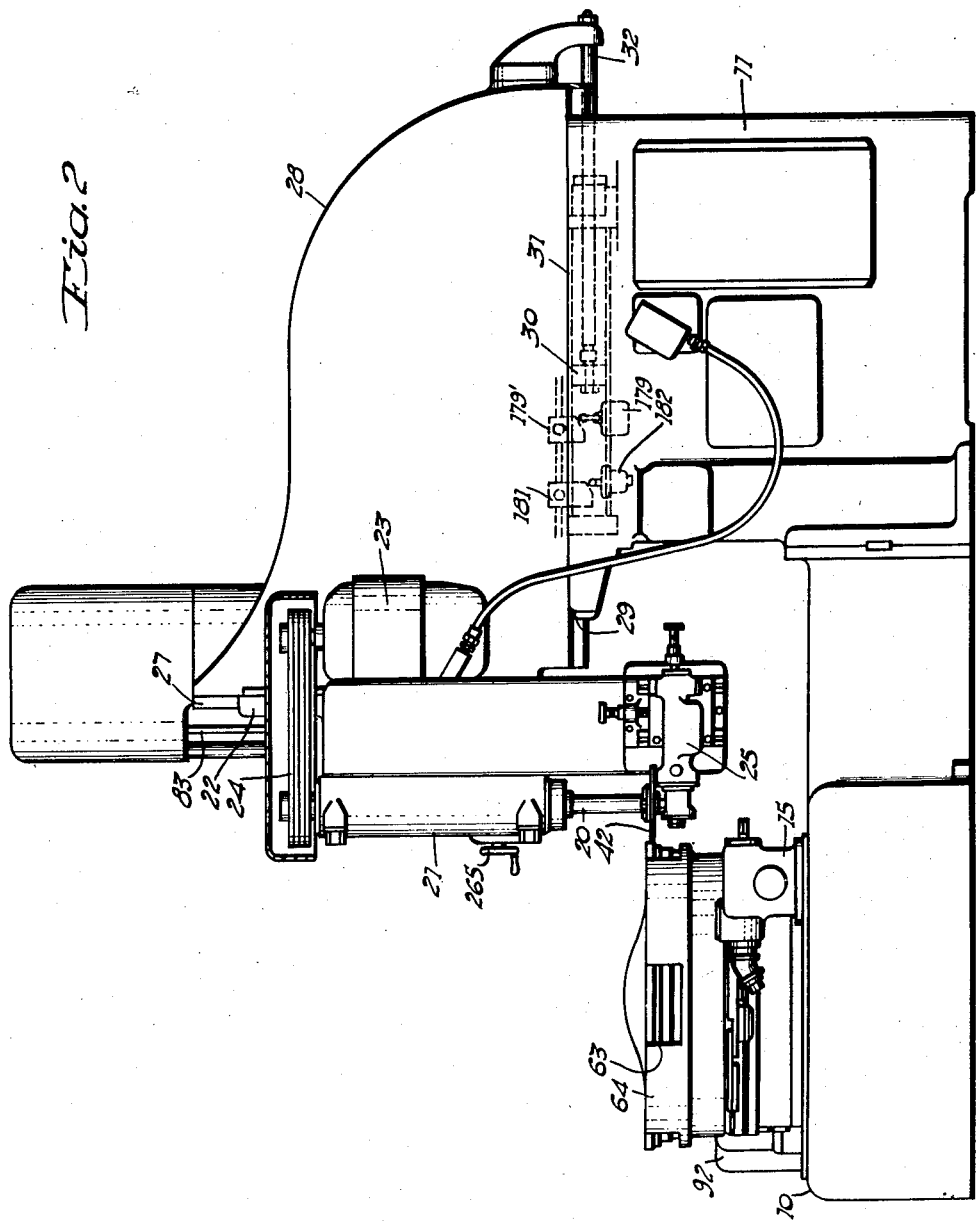

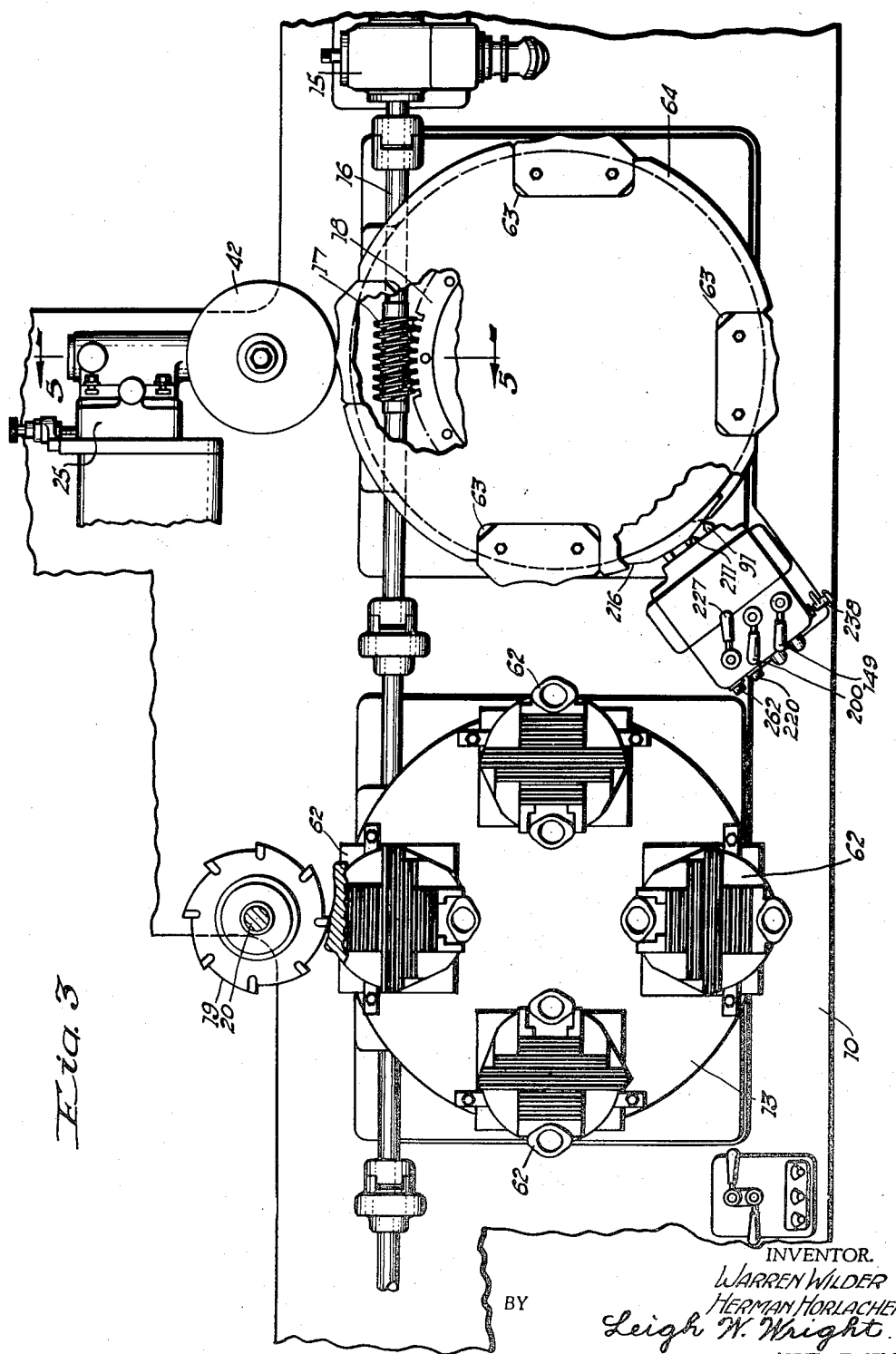

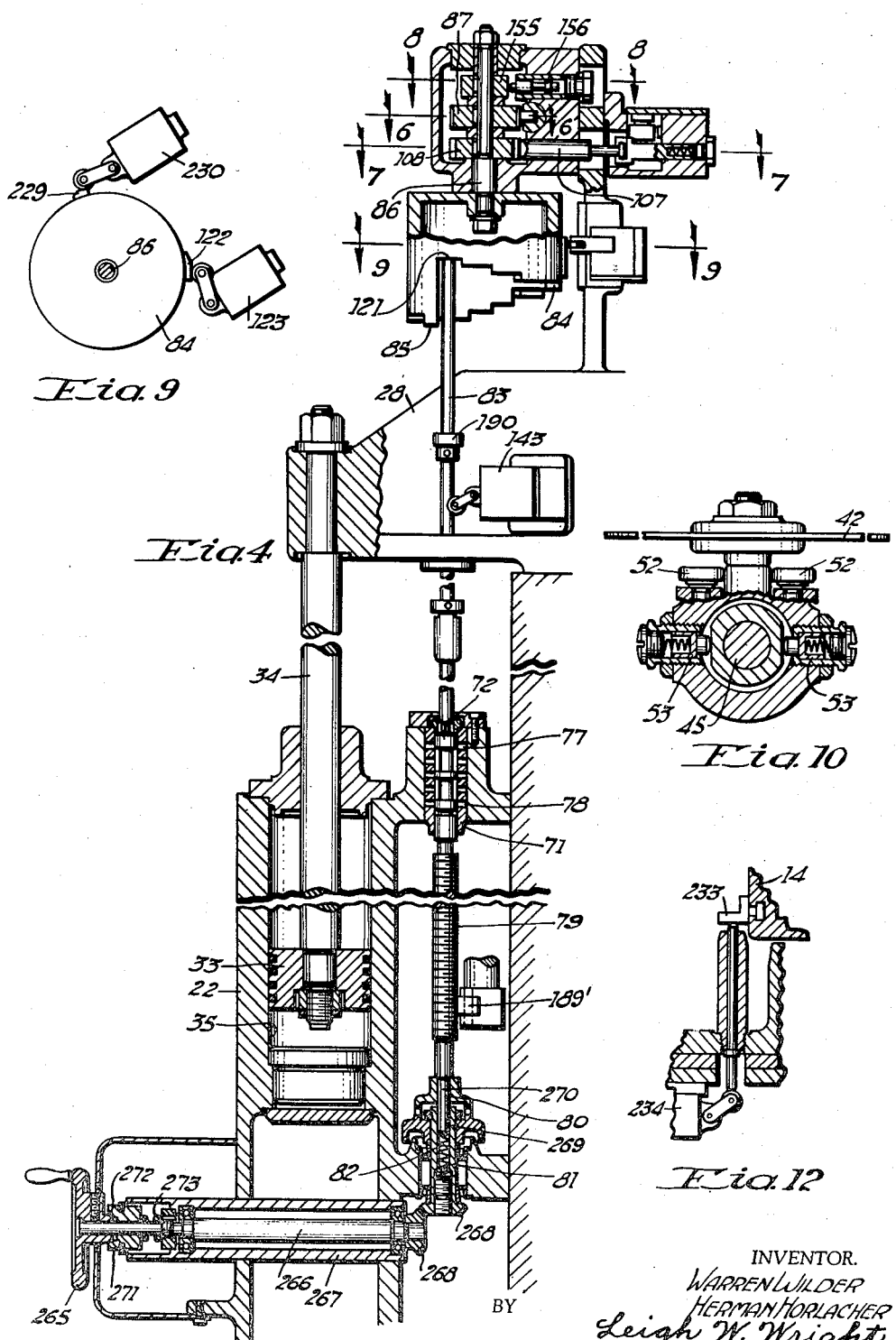

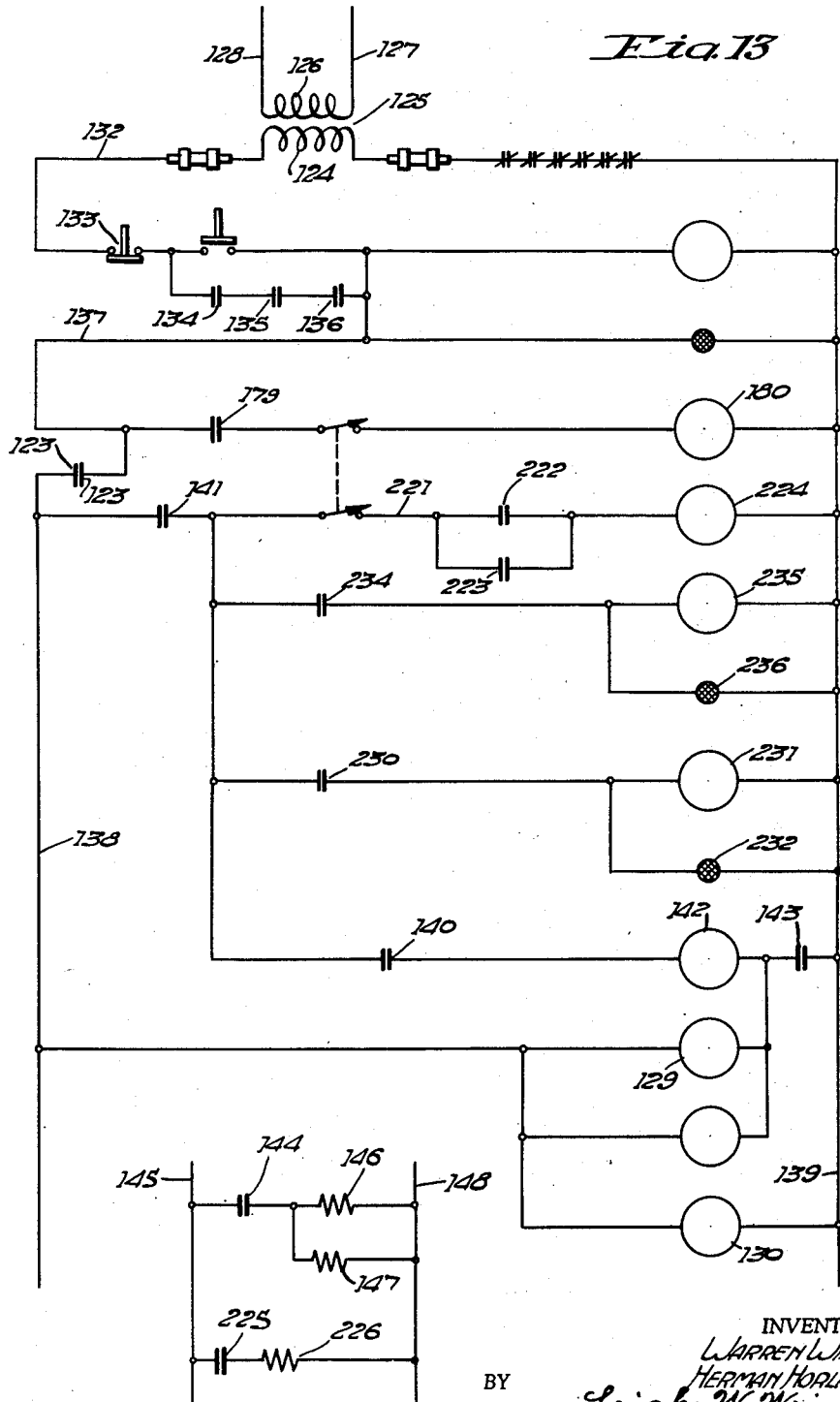

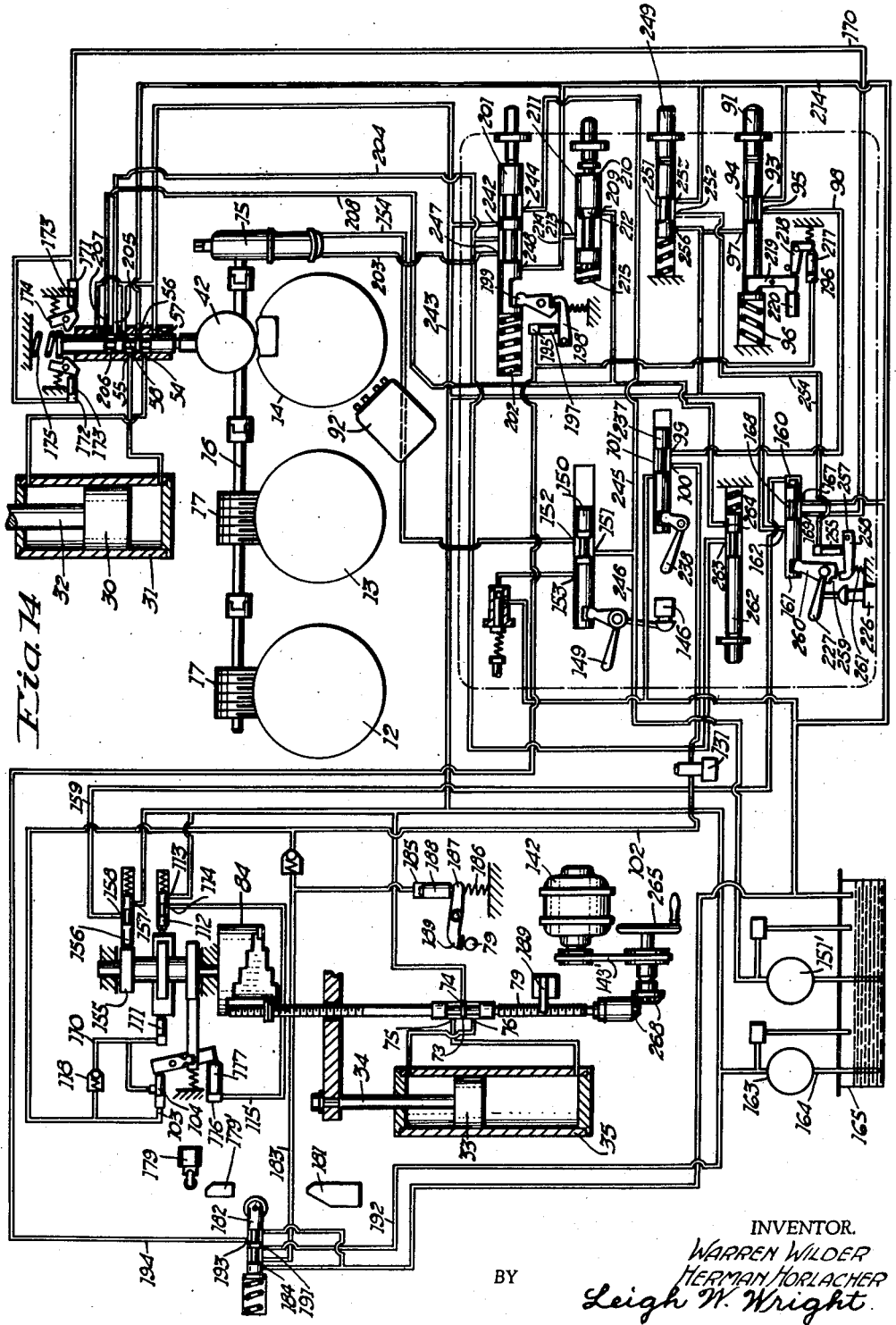

Patented June 21, 1949

2,473,741

UNITED STATES PATENT OFFICE 2,473,741

PATTERN CONTROLLED MILLING MACHINE

Warren Wilder and Herman Horlacher, Cincinnati, Ohio, assignors to The Cincinnati Milling Machine Co., Cincinnati, Ohio, a corporation of Ohio Application November 6, 1943, Serial No. 509,310

27 Claims. (Cl. 90—13.5)

This invention relates to machine tools and more particularly to automatic pattern controlled profile milling machines.

One of the objects of this invention is to provide an improved automatic pattern controlled profiling machine for duplicating profiles on a multiplicity of work pieces simultaneously.

Another object of this invention is to provide an improved automatic rotary profiling machine whereby a given profile may be automatically reproduced on successive work pieces during a single revolution of a work table.

Another object of this invention is to provide an improved automatic pattern controlled milling machine for milling a series of non-contiguous profiled surfaces on each of a plurality of work pieces in one continuous automatic cycle.

A further object of this invention is to provide an automatic skip profiling machine.

Another object of this invention is to provide an improved combined electrical and hydraulic control circuit for controlling an automatic cycle of a rotary profile milling machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine embodying the principles of this invention.

Figure 2 is a side elevation of the machine shown in Figure 1 as viewed from the right of that figure.

Figure 3 is a partial plan view of the work and pattern supporting tables.

Figure 4 is a section on the line 4—4 of Figure 1.

Figure 5 is a section on the line 5—5 of Figure 3.

Figure 6 is a section on the line 6—6 of Figure 4.

Figure 7 is a section on the line 7—7 of Figure 4.

Figure 8 is a section on the line 8—8 of Figure 4.

Figure 9 is a section on the line 9—9 of Figure 4, showing the arrangement of trip dogs on the turret.

Figure 10 is a detail section on the line 10—10 of Figure 5.

Figure 11 is a detail section showing the index and trip dogs.

Figure 12 is a detail section showing one of the trip operated switches.

Figure 13 is a diagram of the electrical control circuit.

Figure 14 is a diagram of the hydraulic control circuit.

It has been found that a demand exists for a machine for milling a series of non-contiguous profiled surfaces on the periphery of certain classes of work, and this invention is therefor directed to a high production automatic cycle machine to meet this demand.

In its simplest form the invention contemplates a rotary table around the periphery of which may be placed a plurality of work pieces with the particular surfaces of the work to be machined arranged at the periphery of the table substantially concentric with the axis of rotation of the table, and a cutter supported for rotation about an axis parallel to the axis of the table, and supported for adjustment both axially and laterally, the lateral adjustment being for the purpose of moving the cutter toward and from the work during rotation of the table to effect the desired profile. A tracer control mechanism governs the profiling movement, it being contemplated that the desired depth of cut shall be effected in a single pass between the cutter and work at a feeding rate and that the table will be rotated at a fast or rapid traverse rate between work pieces.

Provision has also been made whereby after a first profile has been cut on a predetermined number of work pieces during one revolution of the table, a relative indexing shall be effected in an axial direction between the cutter and work table so that a second profile may be formed on the work either identical or different from the first profile and in axially spaced relation thereto.

In the practical form of the invention, provision has been made for two work tables, with a third table for supporting the patterns; a driving mechanism for rotating all of the tables in synchronism, and a common support for the respective cutters and tracer control mechanism arranged in cooperative relation with the tables.

Referring now to the drawings, and more particularly to Figures 1, 2 and 3, the reference numeral 10 indicates the bed of the machine to the rear of which is integrally attached a column 11. The bed supports two work tables 12 and 13 and a pattern supporting table 14 which are suitably supported for rotary movement on the bed, the table 14 being adapted to carry patterns as well as suitable control dogs for governing the automatic cycle. The three tables are adapted to be driven synchronously by a prime mover 15 which is connected through shafting 16 and individual worm and worm gears 17 and 18 to the the respective tables.

A rotary cutter 19 is provided for each work table which may be in the form of a thin flat saw. The cutters are supported by cutter spindles 20 which are journaled for rotation in housings 21 which are attached to a vertically movable carrier 22. Each spindle has its own driving motor 23, as shown in Figure 2, of the drawings, and these motors are directly connected by suitable belting 24 to the respective spindles. The carrier 22 also supports the tracer control mechanism, which is indicated generally by the reference numeral 25 in Figures 1, 2 and 3, by means of a depending arm 26.

The carrier 22 is supported for vertical movement on guides 27 formed on the front end of a cross slide or ram 28 which is guided at 29 on the top of the column 11. The cross slide may be advanced and retracted by means of a piston 30 slidable in a cylinder 31 and connected to the cross slide by means of piston rod 32. The cylinder 31 is fixed to the column 11. As more particularly shown in Figure 4, the vertical slide 22 may be moved also by hydraulic means comprising a piston 33 which is connected by a piston rod 34 to the cross slide 28 whereby the piston remains stationary, the enclosing cylinder 35 being formed in the vertically movable carrier 22.

It will now be apparent that the carrier 22 may be moved up and down corresponding to axial movement of the cutter spindles and may also be moved in a horizontal plane by the cross slide 28, corresponding to lateral movement of the cutter spindles.

The tracer control mechanism 25 which controls the lateral movement of the cutter spindles through control of the flow of fluid into and out of cylinder 31 is more particularly shown in Figure 5. This mechanism comprises a tracer controlled valve plunger 36 which is slidably mounted in a sleeve 37 and continuously urged in one direction by a spring 38 mounted in a bore 39 formed in the end of the plunger, and acting on small plunger 40 slidable in the bore 39 for holding it in engagement with the valve head 41.

The tracer comprises a circular disc 42 which is preferably equal in diameter to the diameter of the cutters. This tracer disc is attached to the end of a stub shaft 43 which is journaled in a T-shaped supporting member 44 having bearing surfaces at 45 and 46 for sliding movement relative to a housing 47. The housing 47 is pivotally supported in the end of the support 25 on pivoting pins 48. It is to be noted that the axis of the stub shaft 43 and the pivot pins are parallel to the axis of the pattern support table. One end of the member 44 is provided with a socket 49 in which is mounted a ball 50 which is also seated in a socket 51 formed in the end of valve 36 which is held in engagement with the ball 50 by the spring 38. It should now be noted that the disc 42 is capable of movement laterally to the axis of shaft 43 which, in turn, will cause axial movement of the tracer control valve 36. In addition, should a steep profile engage the disc 42 causing a thrust thereon in an angular direction relative to the axis of the valve that the housing 47 may swivel about the pivot pins 48 and thereby cause the ball 50 to ride out of the socket 51 and cause axial movement of the valve 36 producing a similar effect as if the tracer were moved laterally of its axis 43.

In order to normally maintain the tracer disc 42 in the position shown and prevent rotation of the member 44 about its cylindrical bearing surfaces 45 and 46, a pair of thrust rollers 52 are mounted on each side of the member 42 as shown in Figure 10, and in addition, a pair of centralizing plungers 53 is mounted in the housing 25 to engage opposite sides of the inner end of the member 47 beyond the pivots 48 to normally restrain swinging movement about these pivots.

It should now be obvious that the tracer disc 42 has a normal movement laterally of its axis 43 to cause axial movement of the valve 36, but should an abnormal thrust out of parallelism with the valve be imparted to the disc 42, it is so supported that it may yield to this thrust and effect movement of the valve and produce the same effect as if shifted laterally.

Referring to the hydraulic diagram, Figure 14, the tracer valve has a pair of ports 54 and 55 which are connected by channels to opposite ends of the cylinder 31; a central exhaust port 56 and a pair of pressure ports 57 and 58. It will be noted from Figure 5 that when the valve 36 is in a central position the valve spools 59, 60 and 61 are all slightly relieved so that there is a slight flow both to the cylinder and to exhaust in such a manner that the resultant pressures in opposite ends of the cylinder 31 are maintained to prevent the cross slide 28 from moving.

Should the valve, however, be shifted in either direction the opening to the exhaust port will be decreased as respects one end of the cylinder, and increased as respects the other, to effect a differential pressure which will cause movement of the piston 30 in one direction or the other.

Thus, the tracer may automatically control in and out movement of the cross slide in accordance with variations in a pattern. It will be noted from Figure 3 that the work table 13 is capable of supporting four work pieces indicated generally by the reference numeral 62, but the number of work pieces is to be considered as illustrative only.

Since four work pieces have been shown the pattern support is similarly provided with four sets of patterns, one set for each work piece. Each set of patterns comprises a series of profiled plates or segments which are mounted in a pocket 63, as shown in Figure 5, which pockets are formed in a pattern support 64 that is bolted to the table 14 by a series of bolts 65. Each set of patterns is secured in the pocket by a pair of bolts 66.

It is intended that the cutters shall cut a series of spaced slots in the work and that the depth of each slot shall conform to a definite pattern. There may be two or more successive slots which have the same pattern whereby the particular pattern segment is made sufficiently thick in accordance therewith, and then a new pattern segment provided for the next change in the shape of the profile. It is for this reason that several pattern segments, such as 67, 68, 69 and 70 are shown in Figure 5.

In order to prevent interference from chips, etc., the parts are so positioned and the machine is so controlled as to start from the bottom and work upward. To this end after each revolution of the tables a relative indexing movement is effected between the cutters and work. The indexing mechanism is shown in Figure 4 and controls a servo-valve indicated generally by the reference numeral 71. Referring to the hydraulic diagram, the servo-valve comprises a valve plunger 72 which has a central spool 73 which is movable relative to a pressure port 74. A pair of ports 75 and 76 on the opposite sides of the pressure port are connected by channels to opposite ends of the carrier cylinder 35.

The valve also has a pair of exhaust ports 77 and 78 as shown in Figure 4, and all valve spools are relieved so that when the spool 73 is in substantially centralized position with respect to the pressure port there is a continuous flow from the pressure port to the exhaust ports, each port provides a sufficient resistance to create an intermediate pressure which is coupled through intermediate port 75 or 76 and thus to opposite ends of the cylinder and of such a nature as to hold the piston 33 stationary relative to the cylinder. When the valve plunger moves to either side of the central position it causes an increase in pressure in one end of the cylinder and a decrease in pressure in the other, resulting in relative movement between the cylinder and piston. When the plunger is released and moves upward to engage a new step on the turret stop, the displacement of the valve spool with respect to the center of the valve creates a positive coupling of pressure to one end of cylinder 35 and a coupling of opposite end to exhaust and thus a relative movement of cylinder 35 with respect to piston 33 and a concomitant movement of the valve sleeve 71 until spool 73 is again substantially centralized when the balanced pressure effect created will cause cessation of movement, and the continued maintenance of the balancing pressures in opposite ends of the cylinder 35 will eliminate possibility of relative creeping of the parts as might take place if dependence were placed solely on a blocking off of the exhaust lines and a much more accurate and sensitive control of relative movement of the parts is effected.

Attention is invited to the fact as shown in Figure 4 that the valve sleeve 71 is integrally connected with the cylinder and since the piston 33 is stationary, it will be obvious that if the cylinder 35 and the carrier 22 in which it is formed move in one direction or the other that the sleeve 71 will also move, but relative to the valve plunger 72 whereby a servo-valve or follow-up effect is obtained. The valve plunger 72 is made integral with an elevating screw 79 and the lower end of this screw is reduced, as shown at 80, for sliding movement relative to a sleeve 81 which is part of the carrier. A spring 82 is mounted in the bore of this sleeve and acts on the end of the reduced portion 81 to exert a constant vertical urge on the valve member 72. The valve member 72 has an integrally connected upwardly extending rod 83 which is for the purpose of engaging steps on an index turret 84 to limit the upward movement. This turret has as many steps arranged thereon as there are slots to be cut in the work. In other words, after each revolution of the tables, the turret is rotated the equivalent of one step and since the starting point is at the bottom step 85 of the turret it will be obvious that during indexing the spring 82 will automatically shift the valve 72 upward as soon as the rod 83 clears the preceding step, and this will cause admission of fluid pressure to the cylinder 35 causing movement thereof until the valve sleeve 71 has followed up the movement of the valve 72 and reequalized the pressures in opposite ends of the cylinder 35. The turret 84 is attached to the lower end of an index shaft 86 which, as shown in Figure 6, has a ratchet wheel 87 keyed thereto.

An indexing plunger 88 is reciprocably mounted in the housing 89 adjacent the periphery of the ratchet wheel 87 and carries a pawl 90 which is adapted to ride over the ratchet teeth upon movement in one direction and cause rotation of the wheel 87 upon movement in the other direction as in the normal operation of a ratchet mechanism.

The reciprocation of the index plunger is effected hydraulically and is automatically controlled from a single control dog 90' on the pattern table, Figure 11, which is adapted to engage an index trip plunger 91 which is slidably mounted in a valve block 92 that is attached to the bed adjacent to the periphery of the pattern table as shown in Figures 1 and 3. This index trip plunger is in the form of a pilot valve, Figure 14, having an exhaust port 93 which is normally connected by an annular groove 94 in the plunger to port 95. The parts are held in this position by a spring 96 interposed between the end of the plunger and the valve housing. When the plunger is depressed by the dog, the groove 94 moves into a position to connect a pressure port 97 with the port 95 whereby fluid pressure will flow through channel 98 into normally interconnected ports 99 and 100 of an index start and stop control valve 101 to channel 102. This channel leads to the end of a cylinder 103 which contains a piston 104. Referring to Figure 7 the piston 104 is adapted to rotate a crank 105 about a pivot 106 to effect withdrawal of a locking plunger 107 from engagement with a detent wheel 108 keyed to the shaft 86. It is necessary that this locking plunger be withdrawn before the ratcheting movement is effected.

Therefore, after the plunger has been withdrawn a hydraulic connection is established with a port 109 which becomes uncovered by the forward movement of piston 104 whereby the fluid pressure may continue through channel 110 to a piston 111 which will effect actuation of the index plunger 88. As this movement is completed a pilot valve 112 arranged in axial alignment with the plunger 88 is shifted to effect interconnection of pressure port 113 to port 114. The latter port is connected by a channel 115 to a cylinder 116 which has a piston 117, the diameter of which is twice the diameter of piston 104. The piston 117 engages the lower end of crank 105 and rotates it in the opposite direction in which it was rotated by the piston 104, even although piston 104 has pressure behind it. This positively forces the locking plunger 107 into engagement with the detent wheel 108 and thereby positively positions the turret stop in its new position.

In the continuous rotation of the pattern table, the trip dog 90' will move out of engagement with the plunger 91 reconnecting port 95 with port 93 and thereby relieve the pressure in channel 102 so that the pressure will eventually be relieved in channel 110 escaping through the check valve 118 whereby a spring 119 located behind the pilot valve 112 will return the ratchet plunger to its starting position. The trip dog for operating the indexing mechanism will obviously be attached to the pattern table at a suitable point to function when the cutters are out of engagement with the work, and the tracer wheel 42 is riding on the plain cylindrical surface 120 of the pattern support 64 as shown in Figure 1.

In order to control a complete automatic cycle of the machine a combined hydraulic electric control circuit is provided, and for ease of understanding the operation, all of the parts are shown in a running position. As just explained, after each revolution of the table a trip dog effects a relative indexing movement between the carrier and the tables whereby the next cutting operation takes place on a new level, and this is repeated several times until the index turret makes a complete revolution which is an indication that all of the necessary cuts have been made on the work and the machine is ready to be stopped.

When the last indexing movement is effected the turret cam 84 has reached its last position in the cycle shown in Figure 4 wherein the plunger 83 is in engagement with the highest step 121. As the turret cam indexed to this position a dog 122 on the turret, Figure 9, tripped a limit switch 123. This switch is shown in the electrical diagram in Figure 13, and the closing of this switch completes a circuit from a source of electrical energy which may be the secondary 124 of a transformer 125 having a primary 126 which is connected by lines 127 and 128 to power mains, to relay coils 129 and 130. This circuit is through line 132, the closed master stop switch 133, closed control switches 134, 135 and 136, line 137, switch 123 and line 138, to the two relay coils 129 and 130 in parallel. It will be noted that the relay coil 130 is directly connected to the return line 139 which terminates in the other side of the secondary 124.

Energization of the relay coil 130 will close switch 140, but serially arranged switch 141 is still open thereby delaying the establishment of a circuit from line 138 through an electric motor 142 and normally closed switch 143 to line 139.

Operation of relay 129 closes a contact 144 which completes a circuit from a power main 145 in parallel through a pair of solenoids 146 and 147 to power main 148. The solenoid 146 is operatively connected to the table start-stop control lever 149, Figure 14, and thereby shifts the control valve 150 connected therewith to a stop position which disconnects pressure port 151 supplied by pump 151' from port 152 and connects the pressure port to an exhaust port 153.

The port 152 is connected by a channel 154 to the hydraulic motor 15, which motor actuates the tables as previously described. It will now be seen that the flow of actuating fluid to this motor is automatically cut off which will stop rotation of the tables.

Energization of solenoid 147 shifts blocking valve 131 in line 102, shutting off any possible flow to the indexing mechanism so that it cannot be operated either automatically or by hand, thereby insuring that it does not get out of synchronism with the table.

The index shaft 86 shown in Figure 4 carries a dog member 155 as more particularly shown in detail in Figure 8 whereby, as the shaft 86 indexes the turret to its last position, it operates a valve 156. This valve, as shown in the hydraulic diagram, has a pressure port 157 which is connected by the shifting of the valve to port 158 whereby fluid pressure will flow through channel 159 to the end of valve cylinder 160 which contains a plunger 161. The valve plunger 161 controls the in and out movement of the cross slide 28.

To this end the valve has a pressure port 162 which is supplied from a pump 163 having an intake 164 through which fluid is withdrawn from a reservoir 165. The pump 163 supplies the control circuits while the pump 151' supplies the motors. The valve also has an exhaust port 167 which is connected by an annular groove 168 to port 169 when the valve is at its "in" position. When the plunger is shifted to the left the pressure port 162 is connected to port 169 whereby fluid pressure will flow through channel 170 in parallel to a pair of cylinders 171 and 172. These cylinders contain plungers 173 which are adapted to rotate cranks 174 in opposite directions respectively as viewed in Figure 14 to effect movement of the tracer controlled plunger 36 in a direction to cause admission of fluid pressure to cylinder 31 in such a manner as to cause retraction of the cross slide 28.

The tracer valve plunger 36 is normally urged in a direction toward the pattern table 14 by a spring 175 and when the cranks 174 are rotated lugs 176 on these cranks engage a flange 177 formed on the end of the valve plunger 36 and effect movement thereof against the resistance of spring 175. Springs 178 are also provided for returning the cranks 174 when the channel 170 is connected to the exhaust port 167 during operation of the machine, thereby freeing the tracer valve so that it may move into operative engagement with the patterns on table 14.

It will now be apparent that rotation of the tables has stopped, and that the cross slide 28 which carries the milling tools, as well as the tracer disc has been retracted. When the cross slide reaches its return position, a dog 179' trips a two circuit double throw switch comprising two switches, one of which is the previously referred to switch 141 and the other is 179. The switch 179, which was closed up to this time, controls energization of a starting coil 180 for the spindle motors 23. Therefore, as this switch is opened the spindle motors 23 are stopped.

At the same time the switch 141 which was open is now closed, completing a circuit through the motor 142 which, as shown in Figure 14, is operatively connected through the driving means 143'—268 to the elevating screw 79. Slightly prior to the operation of the electric switches 141 and 179, however, the dog 181 on cross slide 28 shifts the valve plunger 182 to the left as viewed in Figure 14, thereby connecting a channel 183 to a reservoir line 184. This permits fluid pressure in cylinder 185 to drain to reservoir whereby a spring 186 may shift a lever 187 as well as the valve plunger 188 in a direction to cause engagement of a half nut 189 with the elevating screw 79.

It will now be apparent that upon actuation of the motor 142 and rotation of the screw 79 that the screw 79 being in engagement with the fixed half nut 189 will travel in an axial direction causing movement of the servo-control valve 72 in a direction to cause downward movement of the carrier 22. This will also cause downward movement of the rod 83 out of engagement with the index turret 121. As the rod 83 moves downward to a position below the step 85, a dog 190 carried by the rod operates a limit switch 143. This switch, as previously described, is in series with the motor 142 as shown in the electrical diagram whereby the opening of this switch will stop the motor 142.

The shifting of the half nut control valve plunger 182 also connected a pressure port 191, which is supplied through channel 192 from pump 163, to a port 193 whereby fluid pressure will flow through line 194 to a pair of interlocking cylinders 195 and 196. The cylinder 195 contains a plunger 197 which effects withdrawal of an interlock lever 198 from a rapid traverse control valve lever 199. The lever 199 has a manual control handle 200 operatively connected thereto whereby the rapid traverse control valve plunger 201 may be manually controlled while the cross slide is retracted.

Normally the valve plunger 201 is held in the position shown by a spring 202 and in this position a return line 203 from the hydraulic motor 15 is connected to a line 204. The line 204 terminates in a port 205 in the tracer control valve and which is connected by an annular groove 206 to a port 207. The porting arrangement is such that during the normal operation of the machine the ports 205 and 207 are about half open whereby movement of the tracer valve in either direction will restrict the exhaust flow from the motor and thereby slow down rotation of the tables during abrupt changes in the contour being reproduced.

The port 207 is connected by a channel 208 to port 209 of a feed rate control valve 210. This valve has a plunger 211 upon which is formed a throttling portion 212 which is movable relative to the port 209 to vary the flow therethrough to an exhaust port 213. This exhaust port is connected to a return channel 214 which leads to the reservoir 165. The feed rate control valve plunger 211 is normally urged in one direction by a spring 215 and is controlled by a cam dog 216 as shown in Figure 3 carried by the pattern table 14. There are four of these dogs, one for each work piece.

Thus, a variable feed rate may be obtained, but the main purpose of this control dog is to slow down the rotation of the tables at the moment that the cutters enter a new work piece and then control uniform acceleration.

The interlocking cylinder 196 also contains an interlock plunger 217 which rotates a bell crank 218 to release operating lever 219 for the index valve plunger 91 whereby this plunger may be operated by a manual push button 220 against the resistance of spring 96.

The closing of switch 141 by the retraction of the cross slide also established a circuit through line 221 and parallelly connected, normally closed switches 222 and 223 to relay 224. Operation of this relay closed a switch 225, thereby energizing a solenoid 226 which established an interlock on the cross slide control lever 227 preventing manual operation thereof. Thus, when the cross slide retracts to its out position it automatically establishes an interlock to prevent its return movement to a cutting position as by manual operation of the control lever 227, and it is necessary to break this interlock before return movement can be effected.

As previously stated, the elevating screw 79 opened the switch 143 to stop the motor 142 and the opening of this switch also deenergized relay 129, thereby opening contact 144 and deenergizing solenoids 146 and 147. Deenergization of the solenoid 146 removes the interlock on the table start and stop control lever 149 and deenergization of solenoid 147 reopens valve 131, reestablishing possible flow in channel 102 for the index mechanism.

The machine is now stopped with the cross slide in a return position and interlocked to prevent advance to a running position, the spindle motors have been stopped, the spindle carrier has been run down to a starting position, the previously established interlock on the table stop and start control lever 149 has been removed, whereby rotation of the tables may be manually initiated, and the normally closed switch 143 is held open due to the fact that the dog 190 on rod 83 is still in engagement with the switch 143. With the various operating controls of the machine in the positions indicated, the operator is ready to remove the work and replace it with unfinished work pieces. This is accomplished by intermittently rotating the table from station to station through operation of the table start and stop control lever 149 and an auxiliary control push button to be described. This means that the table will make a complete revolution eventually in changing all four work pieces.

Completion of one rotation of the table will cause the single dog 90′ on the table to come into position again to depress the index plunger 91, resulting in indexing of the turret to its starting position and in so doing a dog 229 on the turret, Figure 9, will close switch 230, thereby energizing the relay 231 and simultaneously lighting a turret signal light 232 which is connected in parallel with the relay as shown in Figure 13.

Operation of the relay will open switch 223 which is in series parallel with cross slide interlock control relay 224. The operator allows the table to continue a small additional amount until a dog 233, Figure 12, on the table operates switch 234 which thereby closes a circuit to relay 235 and simultaneously lights the table signal light 236. When both lights are lit the operator stops the table.

The operation of relay 235 will open switch 222 and since both switches 222 and 223 are now open the relay 224 will become deenergized, thereby opening switch 225 which will result in deenergization of the cross slide interlock solenoid 226, permitting manual operation of the cross slide control lever 227. This lever may now be manually operated to cause advance of the cross slide. Advance of the cross slide will permit switch 179 to close, thereby operating the starter 180 for the spindle motors. At the same time switch 141 which is coupled with switch 179 will open, thereby deenergizing relays 224, 235 and 231. This results in reclosing of switches 222 and 223 but since switch 141 is open it produces no effect on the relay 224. Both of the signal lights will go out and the operator then throws the table stop lever 149 to cause rotation of the tables, whereupon the machine cycle will be repeated.

Numerous auxiliary controls have been provided for set-up purposes and for emergency use and will now be described. The index start and stop control valve 101 has a plunger 237 which is operatively connected to a manual control lever 238 mounted on the side of the valve block 92, as shown in Figures 1 and 3, and this valve is utilized for disconnecting the indexing mechanism from the trip operable index control valve 91 whereby the table may be rotated without having the indexing mechanism operate. As previously suggested, the tables may be rotated at a rapid traverse rate during travel between work pieces for which purpose the rapid traverse control valve plunger 201 was provided. This plunger is adapted to be depressed by a rapid traverse dog 239 which may be mounted in the T-slot 240 shown in Figure 5.

This dog is made of sufficient length to hold the plunger 201 depressed during the skip distance from one work piece to the next. It will be noted from Figure 5 that the feed dog 216 and the rapid traverse dog 239 are mounted in the same T-slot but they have their operating lugs oppositely displaced with respect to the center of the T-slot whereby there is no interference with the control plungers 211 and 201. The same thing is true with the interlock and index control dogs which are mounted in the second T-slot 241.

Rapid traverse movement of the table is effected by interconnecting port 242, which is supplied from pump 163, through channel 243 to port 244 whereby the delivery from pump 163 may flow through channel 245 and thereby combine with the delivery from pump 151' through channel 246 at the port 151 of the start and stop control valve 150. At the same time the rapid traverse valve interconnects port 247 which is the terminus of the exhaust line 203 from the motor 15 to port 248 and thereby to exhaust channel 214. It will be seen that this connection by-passes the throttle connection in the tracer controlled valve whereby the return flow from the motor may go directly to reservoir. As previously explained, the rapid traverse valve may be manually operated by its control lever 200 at will except when the hydraulic interlock prevents operation which is during the normal cycle of operation of the machine.

During the normal cycle of operation of the machine it is always possible to rotate the ram control lever 227 into a position to effect retraction of the ram and thereby move the cutters out of engagement with the work either for inspection purposes or in cases of emergency. In such cases it is necessary to insure that the operator does not return the ram, that is, advance the cutters toward the tables while the various work pieces are opposite their respective cutters because the advancing rate of movement of the ram is too fast for the cutters and may cause damage thereto. In other words, it is preferable that the ram be advanced at some point between the work pieces.

To prevent such an occurrence, an interlock plunger 249 is mounted in the valve block 92 and in the relative position as shown in Figure 5 with respect to the other plungers. There are four control dogs equally spaced about the pattern control table, one of which is indicated at 250 in Figure 11.

The interlock plunger has an annular groove 251 which normally interconnects ports 252 and 253 whereby the channel 254 from interlock cylinder 255 is connected to the return line 214. When the plunger 249 is depressed a pressure port 256 which is supplied from the pump 163 is connected to port 252 whereby the plunger 257 in cylinder 255 rotates the interlock lever 258 out of the path of a notch 259 formed in the lever 260 which connects the handle 227 to the ram control valve plunger 161. It will now be apparent that during a cutting operation the lever 258 is urged upward as viewed in Figure 14 by a spring 261 whereby should the lever 227 be rotated in a counterclockwise direction that the latch 258 will catch in the notch 259 and prevent return rotation of the lever and thus prevent inward movement of the ram should the same be retracted during a cycle of the machine but during non-cutting operations the latch 258 is held in a withdrawn position whereby the lever 227 may be operated.

It may be desirable to effect inching of the tables while the machine is stopped and for this purpose a push button valve 262 has been provided in the circuit.

This control is to be utilized chiefly when the ram 28 is in a retracted position but in this position the ports 205 and 207 of the tracer control valve are disconnected whereby operation of the start and stop control valve 149 would be ineffective. To obviate this situation the valve 262 is provided to short circuit the tracer control valve whereby when it is desirable to inch the tables the start and stop control valve is thrown to a running position and then the push button valve is operated to interconnect ports 263 and 264 to thereby interconnect channel 204 which has a branch connected to port 263 with channel 208 which has a branch connected to port 264 whereby the exhaust fluid from the motor 15 may be directed through the feed rate control valve 210 to reservoir in the usual manner. The valve plunger 262 is mounted in the valve block 92 as shown in Figures 1 and 3.

Manual rotation of the elevating screw 79 is effected by a manually operable hand wheel 265 which is secured to shaft 266 which is journaled in a housing 267 mounted on the front of the carrier.

The shaft 266 is connected by bevel gearing 268 to a sleeve 269 which is journaled for rotation in the carrier but held against axial movement. It will be obvious that a spline connection must exist between the end 270 of the elevating screw and the sleeve in order that the elevating screw may be moved relative to the sleeve by the spring 82 during cyclic operation of the machine. The electric motor which is utilized to effect power rotation of the screw is connected by the belting 143' to a grooved pulley 271 which, in turn, is connected by a friction clutch 272 to the hand wheel 265, the necessary friction being developed by a spring 273. Thus, the elevating screw may be manually or power operated.

There has thus been provided an improved skip profiling machine for cutting a plurality of contoured surfaces on each of several work pieces in an automatic manner comprising a plurality of tables, one of which is a pattern and dog supporting table which controls the automatic cycle of the machine.

The automatic cycle starts with the servo-valve control plunger 83 in its lowest position and opposite to the step 121 with the control dog 190 in engagement with the electric switch 143 thereby holding the switch in a circuit closing position. The ram 28 is in a retracted position with the dog 179' holding the switch 179 closed and holding the valve 182 in a position to remove interlocks on the rapid traverse and index control plungers.

The first operation is to load the work tables through intermittent rotation of the tables under the control of the table start and stop control lever 149 and push button 262. This necessitates a complete revolution of the tables at the end of which the index plunger 91 is operated to effect an indexing of the turret 84 and this, in turn, operates a switch 230 which lights a turret signal light 232. The table signal light 236 is operated by the closing of switch 234.

The operator stops the table and throws the lever 227 to effect advance of the cross slide 28 whereby the cutters are brought into cutting position. This movement is limited by engagement of the tracer disc 42 with the periphery of the pattern control table. The machine is now ready to cut and the operator throws the table control lever 149 to a running position, thus starting the automatic cycle of operation previously described.

What is claimed is:

1. In a skip profiling machine, the combination with a rotary table adapted to support a plurality of work pieces in equally spaced relation about the periphery thereof, of a cutter supported for working in a plurality of planes perpendicular to the axis of table rotation, power operable means for moving the cutter toward and from the work in any of its working planes, means for governing operation of said power operable means including a tracer, a pattern supporting table, a plurality of sets of patterns spaced about the periphery of the pattern supporting table in corresponding relation to the spacing of the work there being a pattern in each set for each operating plane of the cutter, means to effect synchronous rotation of said tables to effect a pattern controlled milling operation on each work piece during one revolution of the tables, and means automatically operable after each rotation of the table to effect relative indexing of the cutter and tracer with respect to said tables to a new working plane, to effect a second pattern controlled milling operation on the work in spaced relation to the first operation upon the next rotation of the tables.

2. In an intermittent profiling machine having a plurality of rotary tables adapted to support a plurality of work pieces in equally spaced relation about the periphery thereof, the combination of a ram supported for movement perpendicular to the axis of rotation of the tables, cutting tools carried by the ram for the respective tables, a pattern supporting table having a plurality of pattern means spaced about the periphery thereof in corresponding relation to the spacing of the work, a tracer carried by the ram for successive engagement with said pattern means whereby a pattern controlled milling operation may be successively performed upon the work pieces in a given revolution of the table, means to rotate the tables in synchronism, and control means operable by the tracer for governing reciprocation of the ram and varying the rate of rotation of the tables.

3. In a profiling machine, the combination of a rotary table adapted to support a plurality of work pieces in spaced relation about the periphery thereof, a rotary pattern supporting table, power operable means for synchronously driving said tables, a cutting tool and a tracer, means to support said tool and tracer for movement to and from said tables, power operable means for reversibly effecting said movement, a tracer controlled valve for governing the extent of said movement to effect reproduction of the pattern in the work, a control circuit for said table operating means including a first control means operable by the tracer for varying the rate of operation and a second control means trip operable from one of said tables for decelerating said tables whenever the cutting tool engages a new work piece.

4. In a profiling machine, the combination of a rotary table adapted to support a plurality of work pieces in equally spaced relation about the periphery thereof, a cutter supported for working in a plurality of planes perpendicular to the axis of table rotation, power operable means for moving the cutter toward and from the work in any of its working planes, means for governing operation of said power operable means including a tracer, a pattern supporting table, a plurality of sets of patterns spaced about the periphery thereof in corresponding relation to the spacing of the work pieces, there being a pattern in each set for each operating plane of the cutter, means to effect synchronous rotation of said tables at a feeding rate to effect a pattern controlled milling operation on each work piece during one revolution of the table, means automatically operable for effecting a rapid rotation of said tables between work pieces, and other means automatically operable after each rotation of the table to effect relative indexing of the cutter and tracer to a new working plane.

5. In a profiling machine, the combination of a rotary table adapted to support a plurality of work pieces in circumferentially spaced relation about the periphery thereof, a cutter, a support for the cutter for positioning the cutter in a plurality of working planes perpendicular to the axis of rotation of the table, power operable means for moving the cutter support toward and from the table in any of its working planes, means for governing operation of said power operable means including a tracer mounted on the cutter support, a pattern supporting table supported for rotation about an axis parallel to the axis of rotation of the work table, a plurality of sets of patterns spaced about the periphery of the pattern supporting table and in corresponding relation to the spacing of the work, there being a pattern in each set for each operating plane of the cutter, means to effect synchronous rotation of said tables at a feed rate to effect a pattern controlled milling operation on each work piece during one revolution of the tables, trip operable means for effecting a rapid rotation of the tables during non-cutting periods of the cutter, and other means on the pattern table and engageable with the tracer for preventing advance of the cutter support during rapid rotation of the tables.

6. In a profiling machine, the combination of a rotary table adapted to support a plurality of work pieces in spaced relation about the periphery thereof, a cutter, a support for the cutter for positioning the cutter in a plurality of planes perpendicular to the axis of table rotation, power operable means for moving the cutter toward and from the work in any of its working planes, a manual control for said power operable means for moving the cutter support to or from a retracted inoperative position, other means for governing operation of said power operable means including a tracer, a pattern supporting table, a plurality of sets of patterns spaced about the periphery of the pattern supporting table in corresponding relation to the spacing of the work, means to effect synchronous rotation of said tables at a feed rate or at a rapid traverse rate, trip operable means for effecting said rapid traverse rate during non-cutting periods of the cutter, and other trip operable means effective during said non-cutting periods to set a latch for preventing operation of said manually operable means should said means be operated to effect retraction of the cutter support to an inoperative position.

7. In a profiling machine, the combination of a rotary table adapted to support a plurality of work pieces in equally spaced relation about the periphery thereof, a cutter supported for working in a plurality of planes perpendicular to the axis of table rotation, power operable means for moving the cutter toward and from the work in any of its working planes, means for governing operation of said power operable means including a tracer, a pattern supporting table, a plurality of sets of patterns spaced about the periphery of the pattern supporting table in corresponding relation to the spacing of the work, there being a pattern in each set for each operating plane of the cutter, means to effect synchronous rotation of said tables at a feeding rate and at a rapid traverse rate whereby during one revolution of the table a pattern controlled milling operation will be performed on each work piece, means automatically operable after each rotation of the table and during rapid traverse movement thereof to effect a relative indexing of the cutter and tracer to a new working plane.

8. In a profiling machine, the combination of a rotary table adapted to support a plurality of work pieces in equally spaced relation about the periphery thereof, and cutters supported for working in a plurality of planes perpendicular to the axis of table rotation, power operable means for moving the cutter toward and from the work in any of its working planes, means for governing operation of the said power operable means including a tracer, a pattern supporting table, a plurality of sets of patterns spaced about the periphery of the pattern supporting table in corresponding relation to the spacing of the work pieces, there being a pattern in each set for each operating plane of the cutter, means to effect synchronous rotation of said tables alternately at a feeding rate or a rapid traverse rate to effect a pattern controlled milling operation on each work piece during one revolution of the tables, fluid operable means including a trip operable valve for effecting a relative indexing of the cutter and tracer to a new working plane to effect a second pattern controlled milling operation on the work in spaced relation to the first operation and a trip dog carried by the pattern supporting table for actuating said valve during each revolution of the tables.

9. In a profiling machine, the combination of a main support, a rotary table journaled thereon and adapted to support a plurality of work pieces in equally spaced relation about the periphery thereof, a cutter, a ram reciprocably mounted on the main support for movement toward and from said table, a carrier mounted on said ram and supporting the cutter for movement parallel to the axis of said table for positioning the cutter in a plurality of working planes perpendicular to the axis of table rotation, power operable means for moving the ram, means for governing operation of said power operable means including a tracer, a pattern supporting table, a plurality of sets of patterns spaced about the periphery of the pattern supporting table in corresponding relation to the spacing of the work, there being a pattern in each set for each operating plane of the cutter, means to effect synchronous rotation of said tables to effect a pattern controlled milling operation on each work piece during each revolution of the tables, and means to effect indexing of said carrier between each revolution including a fluid operable motor, a servo-control valve therefor, means continuously urging the valve in one direction, a stepped index turret to control the extent of valve movement, and means trip operable from one of said tables for indexing said turret.

10. In a profiling machine, the combination of a main support, a rotary table journaled thereon and adapted to support a plurality of work pieces in equally spaced relation about the periphery thereof, a cutter, a ram reciprocably mounted on the main support for movement toward and from said table, a carrier mounted on said ram and supporting the cutter for movement parallel to the axis of said table for positioning the cutter in a plurality of working planes perpendicular to the axis of table rotation, power operable means for moving the ram, means for governing operation of said power operable means including a tracer, a pattern supporting table, a plurality of sets of patterns spaced about the periphery of the pattern supporting table in corresponding relation to the spacing of the work, there being a pattern in each set for each operating plane of the cutter, means to effect synchronous rotation of said tables to effect a pattern controlled milling operation on each work piece during each revolution of the tables, and means to effect indexing of said carrier between each revolution including a fluid operable motor, a servo-control valve therefor, means continuously urging the valve in one direction, a stepped index turret to control the extent of valve movement, means trip operable from one of said tables for indexing said turret, and fluid operable means for positively locking said turret after each indexing thereof.

11. In a profiling machine having a bed, pattern and work supporting tables rotatably mounted on the bed, a ram mounted on the bed for movement in a plane perpendicular to the axis of rotation of said table, a carrier reciprocably mounted on the ram in a plane parallel to the axis of rotation of the tables, cutting means and tracing means mounted on the carrier, one of said tables being adapted to support a plurality of sets of pattern plates in circumferentially spaced relation on the table, each set including a plurality of pattern plates in a direction parallel to the axis of the table, power operable means for rotating said tables to effect a first pattern controlled milling operation on the work, fluid operable means to effect indexing of the carrier after each revolution of the tables to position the tracing means in the plane of a new pattern including a trip operable control valve, an index turret, fluid operable means for indexing said turret, a supply line connecting said valve and said fluid operable means, and means operable by said turret after a predetermined number of indexing movements thereof to stop rotation of the tables and to block said supply line.

12. In a profiling machine having a bed, pattern and work supporting tables rotatably mounted on the bed, a ram mounted on the bed for movement toward and from said table, a carrier reciprocably mounted on the ram for movement parallel to the axis of rotation of the tables, cutting means and tracer control means mounted on the carrier in cooperative relation with the respective tables and a transmission and control circuit for the machine including a manually operable valve having separate positions to effect advance and retraction of the ram, motors mounted on the carrier for driving the cutting means, an automatically operable indexing mechanism for shifting the carrier to a new working position after each rotation of the table and including an indexible turret stop, and means controlled by the turret for effecting automatic shifting of said manual control to a position to effect retraction of the ram at the end of the machine cycle, and means responsive to retraction of the ram for stopping said spindle motors.

13. In a profiling machine having a bed, rotatable work and pattern supports mounted on the bed and a ram mounted on the bed for movement toward and from said supports, the combination of a carrier mounted on the ram for movement parallel to the axis of said tables, cutting means and tracer control means mounted on the carrier for cooperation with parts on the respective tables, means for indexing the carrier to position said cutting means and tracing means in a new working plane, said means including a servo-motor having a servo-valve plunger, a rotatable index turret stop, means normally urging the valve plunger in engagement with said stop, an elevating screw integrally connected with said plunger, a drive motor therefor, a disengageable nut means supported by the carrier in cooperative relation with said screw, means operable by the turret at the end of the machine cycle to cause retraction of the ram, and means responsive to retraction of the ram for effecting engagement of said nut means with the elevating screw and also causing rotation of the motor to effect retraction of the servo-valve plunger out of engagement with the turret and thereby shifting of the carrier to its starting position for the next cycle of operation of the machine.

14. In a profiling machine having a bed, rotatable work and pattern supports mounted on the bed and a ram mounted on the bed for movement toward and from said supports, the combination of a carrier mounted on the ram for movement parallel to the axis of said tables, cutting means and tracer control means mounted on the carrier for cooperation with parts on the respective tables, means for indexing the carrier to position said cutting means and tracing means in a new working plane, said means including a servo-motor having a servo-valve plunger, a rotatable index turret stop, means normally urging the valve plunger in engagement with said stop, an elevating screw integrally connected with said plunger, a drive motor therefor, a disengageable nut means supported by the carrier in cooperative relation with said screw, means operable by the turret at the end of the machine cycle to cause retraction of the ram, means responsive to retraction of the ram for effecting engagement of said nut means with the elevating screw and also causing rotation of the motor to effect retraction of the servo-valve out of engagement with the turret and thereby shifting of the carrier to its starting position for the next cycle of operation of the machine, a trip carried by the servo-valve plunger, and means operable by said trip for stopping said motor after the servo-valve plunger has cleared the turret.

15. In a profiling machine having a bed, rotatable work and pattern support mounted on the bed and a ram mounted on the bed for movement toward and from said supports, the combination of a carrier mounted on the ram for movement parallel to the axis of said tables, cutting means and tracer control means mounted on the carrier for cooperation with parts on the respective tables, means for indexing the carrier to position said cutting means and tracing means in a new working plane, said means including a servo-motor having a servo-valve plunger, a rotatable index turret stop, a supply line for controlling indexing thereof, means normally urging the valve plunger in engagement with said stop, an elevating screw integrally connected with said plunger, a drive motor therefor, a disengageable nut means supported by the carrier in cooperative relation with said screw, means operable by the turret at the end of the machine cycle to cause retraction of the ram, means responsive to retraction of the ram for effecting engagement of said nut means with the elevating screw and also causing rotation of the motor to effect retraction of the servo-valve out of engagement with the turret and thereby shifting of the carrier to its starting position for the next cycle of operation of the machine, a trip carried by the servo-valve plunger, means operable by said trip for stopping said motor after the servo-valve plunger has cleared the turret, and devices controlled by said trip operable means for opening the index supply line.

16. In a profiling machine having a bed, work and pattern supports mounted thereon and a ram mounted on said bed for movement toward and from said work and pattern supports, cutting means and tracer control means carried by the ram for engagement with parts carried by the respective supports, the combination of control means including a manually operable control lever for effecting retraction of the ram, means responsive to said retraction to lock said control lever against manual movement, a manually operable control for causing rotation of the tables while the ram is in a returned position, means to effect a single rotation of the tables after the ram has been returned, and means automatically effective and trip actuated by one of said tables to unlock said first manual control lever to permit advance of the ram.

17. In a pattern controlled milling machine having work and pattern supports and a ram slidably mounted for movement toward and from said supports, the combination of an indexible carrier mounted on said ram, a servo-motor for actuating said carrier including a servo-valve plunger, an indexible turret stop for said plunger, means normally maintaining said plunger in engagement with said stop, means to effect retraction of said plunger, including a power driven screw and a releasable nut means, means responsive to retraction of the ram for causing engagement of said nut means whereby the carrier may be driven to a starting position at the end of a machine cycle, and means responsive to advance of the ram for releasing said nut means and permitting engagement of the servo-valve with the turret stop.

18. In a profiling machine having a series of rotary work and pattern supporting tables, power operable means connected for synchronously driving said tables, a slide, a plurality of cutters and a tracer mounted on said slide, said tables being adapted to support a plurality of circumferentially spaced work pieces thereon, a plurality of similarly spaced pattern means on the pattern table, means controlled by the tracer for governing movement of the slide toward and from the table and a control mechanism for said power operable means including a valve block having a series of control plungers radially arranged with respect to the axis of the pattern table and spaced in a direction parallel to the axis of said table, similarly spaced sets of control dogs carried by the table in cooperative relation to said plungers for controlling rotation of the tables in synchronous relation to the position of the patterns with respect to the tracer.

19. In a profiling machine having a series of work and pattern supporting tables, a slide supported for movement toward and from said tables, cutting means mounted on the side for cooperation with the work tables, a tracer mounted on the ram for cooperation with the pattern table, means controlled by the tracer for governing movement of the slide, a power operable motor for synchronously driving said tables and a control circuit for said motor including throttling valve means in the tracer, automatic means for shifting the tracer independent of the patterns to effect retraction of the slide, said shifting of the tracer closing the throttle valve, and means to bypass the throttling valve to effect rotation of the tables while the slide is in a retracted position.

20. In a profiling machine having work and pattern supporting means, a slide, cutting means and a tracer mounted on the slide for relative movement with respect to said work and pattern means, means to effect indexing of the cutting means and tracer relative to said work and pattern means perpendicular to the axis of movement of the slide including an index plunger, trip operable means carried by the pattern supporting means for automatically actuating said plunger, manually operable means for said plunger, means to lock said manually operable means during an automatic cycle of the machine, means responsive to retraction of the slide for unlocking said manually operable means, a supply line and a manually operable valve and an automatically operable valve serially arranged in said line for blocking the flow therethrough.

21. In a profiling machine having work and pattern supporting means, a slide movable relative thereto and supporting cutting means and a tracer, power operable means for moving the slide, control means governed by the tracer while in engagement with said pattern means for controlling movement of said slide, power operable means for effecting relative movement between the work and pattern supporting means and said slide and including a rapid traverse control valve, trip operable means carried by the pattern supporting means for controlling said valve during an automatic cycle of the machine, manually operable means for said valve, an interlock normally effective to prevent actuation of said manually operable means during an automatic cycle, and means responsive to retraction of the slide to remove said interlock.

22. In a tracer controlled milling machine, the combination of means for rotating a work and pattern supporting means relative to an operatively related cutter and tracer, means for supporting the cutter and tracer for radial movement with respect to said work and pattern supporting means, power shifting means controlled by the tracer for effecting movement of the cutter toward and from the axis of the work supporting means in accordance with a pattern contour, power operable means for effecting a relative indexing of the cutter and tracer relative to the work and pattern in a direction parallel to the axis thereof while the power shifting means maintains the tracer in engagement with the pattern, and means trip operable upon each revolution of said supporting means to energize said power operable means.

23. In a tracer controlled milling machine, the combination of means for rotatably supporting a plurality of work pieces and a pattern for movement relative to a cutter and tracer, means for supporting the cutter and tracer for radial movement with respect to said work and pattern supporting means, power shifting means controlled by the tracer for effecting movement of the cutter toward and from the axis of the work supporting means in accordance with a pattern contour, power operable means for effecting a relative indexing of the cutter and tracer relative to the work and pattern during non-cutting periods the tracer engagement with the pattern determining the position of the cutter during the indexing movement, a trip operable device for energizing said power operable means, and means effective after each revolution of the work and pattern supporting means for operating said device.

24. In a pattern controlled milling machine, the combination of work and pattern supporting means, power operable means for rotating said supporting means relative to an operatively related cutter and tracer, means for supporting said cutter and tracer for radial movement with respect to said work and pattern supporting means, said tracer having a pattern shiftable portion, power shifting means controlled by movement of the shiftable portion of the tracer for maintaining the tracer in contact with a pattern carried by said pattern supporting means, power operable means for effecting a predetermined number of indexing movements of the cutter and tracer relative to the work and pattern in a direction parallel to the axis thereof, means trip operable upon each revolution of said supporting means to energize said power operable indexing means whereby an indexing movement takes place upon each revolution of said supporting means, and means responsive to the last indexing movement to disconnect power from each of said power operable means and simultaneously to move the tracer controlled power shifting means into a position to cause separaiton of the cutter and tracer from said work and pattern supporting means.

25. In a pattern controlled machine tool, the combination of rotatable work and pattern supports and operatively related cutter and tracer, means to support the cutter and tracer for relative movement toward and from said work and pattern supports, reversible power operable means controlled by the tracer for effecting said movement, power operable means for positioning the tracer so as to hold said cutter and tracer in retracted position with respect to the work and pattern supports, a manually operable device for releasing said last-named power operable means, means associated with the tracer and responsive to release of said power operable means for positioning the tracer to cause engagement of the cutter and tracer with the work and pattern, and a second manually operable device for causing return of said first-named power operable means to start a pattern controlled milling operation.

26. In a pattern controlled milling machine having means for rotating a work and pattern supporting means relative to an operatively related cutter and tracer, means for supporting the cutter and tracer for movement toward and from the work and pattern supporting means, additional means for supporting the cutter and tracer for indexing movement parallel to the axis of said work and pattern rotating means, and power operable means for effect ng a relative indexing of the cutter and tracer upon each revolution of said work and pattern supporting means including a fluid operable motor, a servo-control valve therefor, means continuously urging the valve in one direction, a stepped indexible turret to control the extent of valve movement, and means trip operable upon each revolution of said work and pattern supporting means for ndexing said turret.

27. In a machine tool, a rotatable work piece spindle, means on said spindle for supporting a work piece for rotation with said spindle, a plurality of contour cams in parallel array mounted for rotation with said work spindle, a cam follower for selective control by any of said cams, a cutting tool, means supporting said spindle and tool for relative motions lengthwise and crosswise of the axis of said spindle and said cams and follower for corresponding relative motions lengthwise and crosswise of the axis of rotation of said cams, means for producing such crosswise motion to feed and retract the work and tool relatively and to bring said follower and any selected cam into or out of cooperative relation, means for producing such relative axial motions, a plurality of stops corresponding in number to said contour cams and indexable to present said stops sequentially into operative relation to said axial moving means to stop said relative axial motion in one direction with said follower in operative relation to the cam corresponding to said stop, and means acting while said axial moving means presses against said stop for actuating said crosswise motion-producing means to cause said cutter to cut the work in a contour corresponding to that of the contour cam then acting on said follower.

WARREN WILDER.
HERMAN HORLACHER.

REFERENCES CITED

The following references are of record in the file of this patent:

UNITED STATES PATENTS

| Number | Name | Date |
|---|---|---|
| 648,288 | Owen | Apr. 24, 1900 |
| 1,084,625 | Hanson | Jan. 20, 1914 |
| 2,017,927 | Steiner | Oct. 22, 1935 |
| 2,050,127 | Sassen | Aug. 4, 1936 |
| 2,068,890 | Sassen | Jan. 26, 1937 |
| 2,117,916 | Silven | May 17, 1938 |
| 2,301,028 | Esch | Nov. 3, 1942 |

FOREIGN PATENTS

| Number | Country | Date |
|---|---|---|
| 15,235 | Great Britain | June 25, 1914 |